United States Patent [19]
Hogan

[11] Patent Number: 5,880,966
[45] Date of Patent: Mar. 9, 1999

[54] APPARATUS USING SCORING ADVISORS HAVING OUTPUTS COMBINED ON A BACK PLANE FOR EVALUATING DESIGNS

[75] Inventor: Taylor Elsom Hogan, Victor, N.Y.

[73] Assignee: Xynetix Design Systems, Inc., Fishers, N.Y.

[21] Appl. No.: 572,041

[22] Filed: Dec. 14, 1995

[51] Int. Cl.$^6$ ...................................................... G06F 17/00
[52] U.S. Cl. ........................... 364/488; 364/489; 364/490; 364/152
[58] Field of Search ........................... 364/488, 489–491, 364/578, 468.03, 152, 551.01, 553, 490; 395/500, 2.09, 51

[56] References Cited

U.S. PATENT DOCUMENTS

| | | | |
|---|---|---|---|
| 5,111,413 | 5/1992 | Lazansky et al. | 364/578 |
| 5,280,563 | 1/1994 | Gannog | 395/2.09 |
| 5,428,712 | 6/1995 | Elad et al. | 395/51 |
| 5,465,204 | 11/1995 | Sekine et al | 364/152 |
| 5,539,652 | 7/1996 | Tegethoff | 364/490 |
| 5,552,995 | 9/1996 | Sebastian | 364/468.03 |
| 5,557,775 | 9/1996 | Shedletsky | 395/500 |
| 5,574,889 | 11/1996 | Jindo et al. | 395/500 |

OTHER PUBLICATIONS

Beek et al. "Automated Processor Specification and Task Allocation for Embedded Multicomputer Systems: The Packing Based Approaches," IEEE, Oct. 1995 p. 44–51.

*Primary Examiner*—Kevin J. Teska
*Assistant Examiner*—Vuthe Siek
*Attorney, Agent, or Firm*—Cumpston & Shaw

[57] ABSTRACT

Apparatus for evaluating a design includes a memory for storing data representing a current design for the device; a host processor connected to the memory and having a change input for receiving an input signal representing a change in the design, an event output for generating an event signal representing at least that a change has occurred; a plurality of advisors, each advisor having an event input for receiving the event signal; a data input connected to the memory, an advisor processor for generating scoring signals representing a selected quality of the design, and presenting the scoring signal to an advisor scoring output; an advisor backplane connected between the host processor and the advisors, the advisor backplane having an event input coupled to the host processor for receiving event signals, an event output coupled to the advisors' event inputs, and a scoring input connected to the advisors' scoring outputs for receiving the scoring signals from the advisors and for combining the scores for generating a unified scoring signal representing the overall quality of the design and transmitting the unified scoring signal to the host.

44 Claims, 7 Drawing Sheets

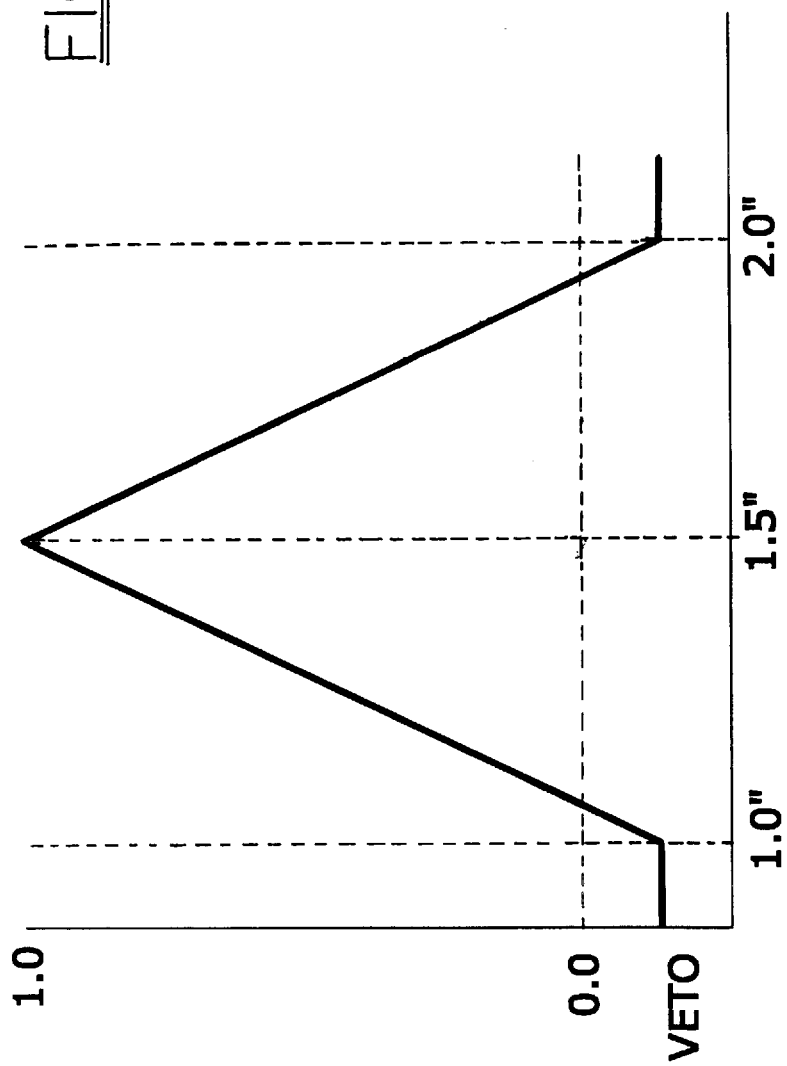

APPARATUS USING SCORING ADVISORS HAVING OUTPUTS COMBINED ON A BACK PLANE FOR EVALUATING DESIGNS

FIELD OF THE INVENTION

This invention relates generally to a method and apparatus for automatically and/or interactively optimizing electrical, mechanical and other designs, and more particularly to apparatus and a method for using a plurality of advisors for evaluating particular aspects of a design and an advisor backplane for producing scoring signals indicating the quality of that aspect of the design and producing an overall quality signal that can be used in manual or automatic design optimization.

There are many systems that can be used for automatically or interactively placing devices such as, but not limited to electrical devices on a printed circuit board or substrate, relative to any given quality measurement (metric). Most such systems focus on minimizing interconnect length because long interconnects reduce the speed at which the device can operate and increase noise. Analysis of other constraints is typically performed after the placement is complete. Generally, two types of placement algorithms have been employed, constructive placement and iterative placement. Constructive placement begins with a bare substrate, in the case of a printed circuit board or module for example, and selects one device at a time for placement. The devices are placed in a queue and sorted based on how heavily interconnected they are to a predefined anchor point, such as the connectors or another previously placed device. The most heavily interconnected device is then placed within a connect minimized relative to the anchor device. The process continues until all the devices in the queue have been placed. There are many limitations to this constructive design approach, including the ability to effectively handle only one cost function at a time. Known algorithms do not have the ability to look ahead, therefore a decision made early in the design process that is subsequently determined to be less than optimum is difficult or impossible to fix. These algorithms cannot predict or anticipate constraints and not efficiently handle the interaction among multiple cost functions.

It is an object of this invention to provide a novel iterative placement methodology, and apparatus and a method for carrying out the methodology which begins by selecting all the devices to be placed, and then surveys the substrate to predetermine a set of possible locations for each device, based on topological constraints. The system then proceeds by automatically generating multiple scenarios. Each scenario is evaluated based on user defined design constraints. The device is selected for repositioning with each generation of the layout based upon the probability that the movement may improve the overall placement. The apparatus for enabling this iterative placement methodology employs a software architecture that separates the responsibility for generating multiple placement scenarios from that of evaluating the resultant placement scenarios. This architecture allows the user of the software product to customize the evaluation of the placement scenarios, resulting in final placements which are precisely optimized for the user defined requirements of the design. This customization can go beyond the usual method of specifying a predetermined set of control parameters. In fact, any quality that the user can measure or calculate can be incorporated into the overall placement process. This invention produces a more appropriate placement in less time than has been heretofore possible.

The invention includes three modules, each of which is made up of a processor and computer software for controlling the processor for carrying out the function of the module. In some cases, the same physical processor or processors may carry out the functions of more than one module in a multi tasking computer environment. Alternatively, separate processors may be provided for each module.

The first module or modules are the advisors. An advisor is a computer processor and associated program that analyzes the state of data or database that represents the current configuration of a design such as the design for a printed circuit board, and when requested to do so, performs a computation that evaluates a quality of the design. Advisors per se are not a part of this invention, except in combination with other elements thereof. An advisor may evaluate, for example, the thermal quality of a design, that is, how much heat a component generates, or the total amount of heat generated by a design being considered. The thermal advisor may know the maximum temperature a component can withstand, and use that value as an upper bound for evaluating the design.

An advisor may monitor an electrical quality of the design, for example, the length of an electrical connection between two components. The advisor may apply a rule, for example, that the connection can be no longer than two inches, no shorter than one inch, and preferably is 1.5 inches. Preferably, the advisor produces a signal indicative of the quality of the design by comparing the actual length of the electrical connection to the rule.

Preferably, the advisor generates a score each time it is asked to do so. If the advisor is asked to generate a score, but is unable to do so, or if the aspects of the design that affect the particular advisor have not changed, it preferably responds with the most recently generated score which it stores in memory associated with the advisor, thus avoiding a possibly lengthy and unnecessary recalculation.

All advisors report scores using the same normalized units, such as a number between 0 and 1. Advisors may be provided that also report special status, such as a veto when a change violates a rule, or no data when insufficient information is available for the advisor to make a determination.

The advisors are associated with a host as will be described later with a host. The host is also a processor and an associated computer program. The host includes or is connected to a memory for storing data, preferably a database, that describes the design. The host is capable of accepting a signal from a user which may be an operator or another computer program to change the design. Preferably, the signal is a request for a change message that includes a description of the object in a database that is to be changed and the action to be performed on the object to generate the change. The host makes the necessary modifications to the data stored in the memory and generates a change notification message (event signal). The event signals are ultimately passed to the advisor(s) as will be described and the host receives a score from the advisor(s) as will be described as a score that the host uses to determine whether the change represents an overall increase in quality of the design. The host uses the quality signal to determine whether the request for a change should be accepted or discarded.

This invention relates particularly to an advisor backplane connected between the host and the advisors that controls information passing between the host and the advisors. The advisor backplane also includes a processor and associated software. The advisor backplane manages the instantiation, definition, and deletion of advisors. The backplane receives signals from the host and transmits them to the advisors, and receives signals from the advisors and transmits them to the host.

The advisor backplane receives the individual scores of the advisors and combines the scores to provide an overall quality score. Preferably, the backplane performs a non-linear averaging of the scores.

From the perspective of the host, the method by which the individual scores and the overall quality score are determined need not be known.

Preferably stated and in accordance with a presently preferred embodiment of this invention, an apparatus for evaluating a design includes a memory for storing data representing a current design for the device; a host processor connected to the memory and having a change input for receiving an input signal representing a change in the design, and an event output for generating an event signal representing at least that a change has occurred; a plurality of advisors, each advisor having an event input for receiving the event signal; a data input connected to the memory, and an advisor processor for generating scoring signals representing a selected quality of the design, and presenting the scoring signal to an advisor scoring output; and an advisor backplane connected between the host processor and the advisors, the advisor backplane having an event input coupled to the host processor for receiving event signals, and an event output coupled to the advisor's event inputs, and a scoring input connected to the advisor's scoring outputs for receiving the scoring signals from the advisors and for combining the scores for generating a unified scoring signal representing the overall quality of the design and transmitting the unified scoring signal to the host.

In accordance with another aspect of the invention, the host processor has a data output connected to the memory for updating data stored in the memory in response to the input signal representing a change in the design and the plurality of advisors is connected to the memory for retrieving data representing the change in the design, and utilizing the data to generate the scoring signal.

In accordance with yet another aspect of the invention, the host processor passes information about the change to the advisors from which a new quality signal can be determined.

In accordance with a further aspect of the invention, the advisors include a memory for storing a most recent scoring signal and the advisor processor provides the most recent scoring signal as a current score if a new current score cannot or has not been calculated.

While the novel aspects of the invention are set forth with particularity in the appended claims, the invention itself, together with further objects and advantages thereof may be more readily comprehended by reference to the following detailed description of a presently preferred embodiment of the invention, taken in conjunction with the accompanying drawing, in which:

FIG. 7 is a graphical representation of the advisor output signal for the input of FIG. 6 in accordance with this invention.

DETAILED DESCRIPTION OF THE PREFERRED EMBODIMENT

Figure 1:
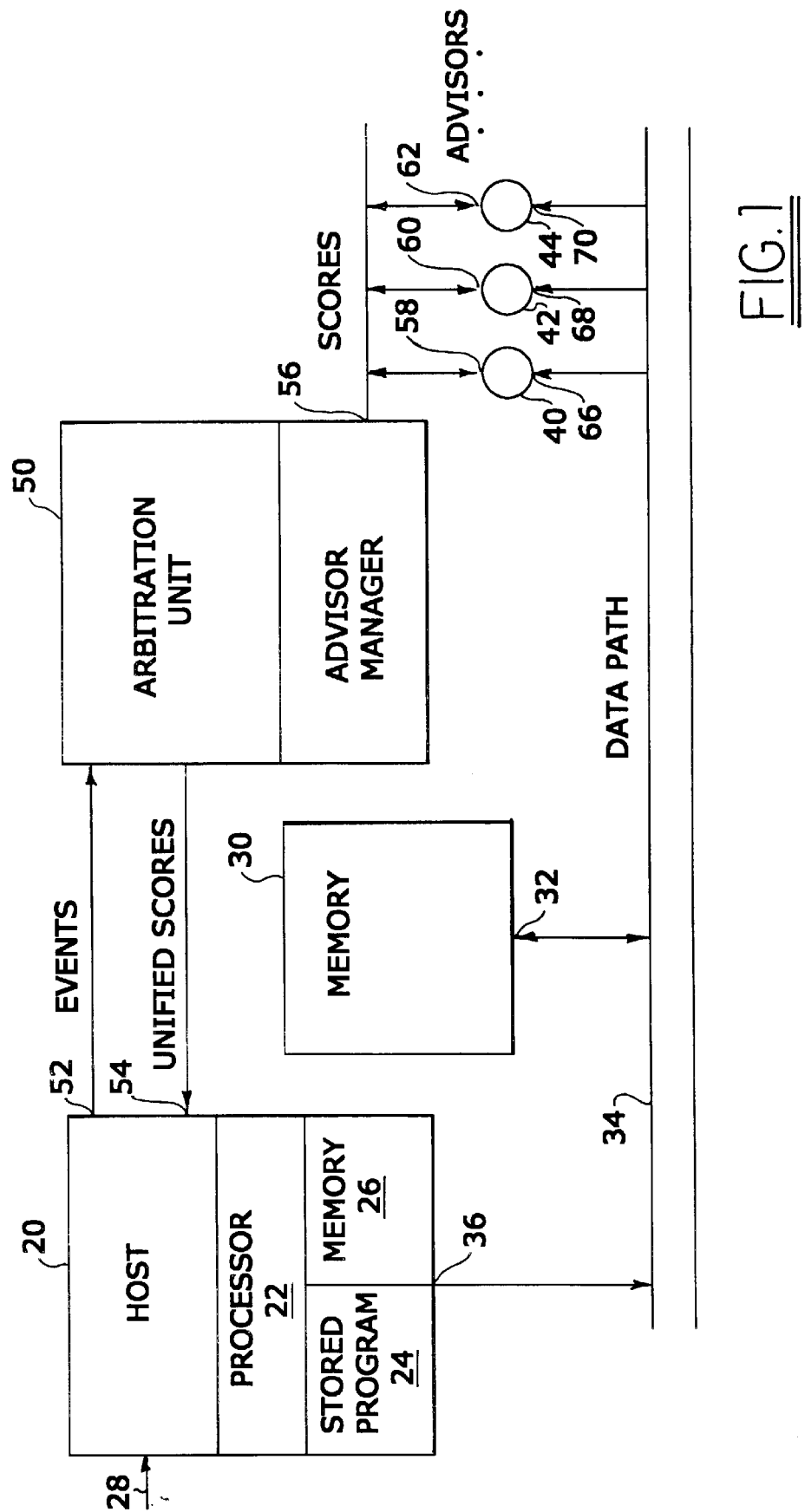
FIG. 1, 1a are block diagram of the apparatus for optimizing designs in accordance with this invention.
Figure 1A:
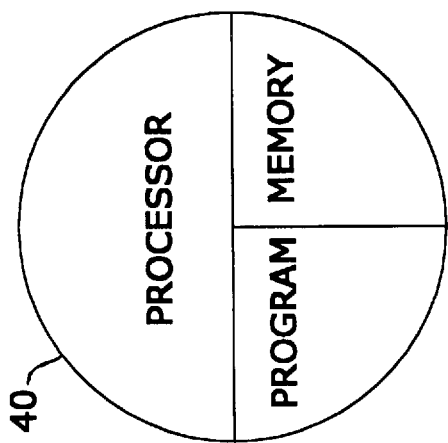

Referring now to FIG. 1, an apparatus for optimizing design in accordance with this invention includes a host 20 that has a processor and a memory both for storing a computer program and working memory for executing the program. The host may be a suitably programmed general purpose computer such as a computer using the Unix or Windows operating system, or any other suitable, preferably multi-tasking operating system. The host has an input 28 for receiving an input signal representing a change in a design. Information describing the design is preferably stored in memory 30 preferably in the form of a database, connected to the host by way of an input/output port 32 that is coupled to a data bus 34, to which the host 20 is also connected by way of a data output 36. Preferably, the memory stores information concerning the design in the form of a data base that can be managed either autonomously by a dedicated processor connected to the memory 30, or by the host 20 or a separate host (not shown).

The host 20 accepts a request for a change message at input 28 comprising two parts, a description of the object in the data base that is to change, and the action that is to be performed on the object to generate the change. For example, a designer may wish to change the location of a part. The description of the object in the data base that is to change would be an identification of the part that is to be moved. The action that is performed on the object to generate the change could be the old coordinates of the object and the new coordinates of the object showing the direction and magnitude of the move.

Preferably, the host acts upon the request for the change message by changing the data base stored in memory 30 to implement the move.

A plurality of advisors 40, 42 and 44 communicates with the host by way of an advisor backplane 50. The host 20 has an event output 52 and a scoring input 54 that are connected to the advisor backplane 50. The advisor backplane also includes an event output 56 that is connected to event inputs 58, 60 and 62 of advisors 40, 42 and 44 respectively. Either a bus type connection or a plurality of independant connections can be used in accordance with the invention, and as used in this application, the connection includes both.

A typical advisor 40 preferably includes a processor, a stored program, and a memory. The advisors may share their processors and/or the program and memory with the host, or they may be separate devices. Preferably, each advisor receives an event by way of its input. The advisors are connected to the memory 30 by way of data inputs 66, 68 and 70, which are connected to the memory 30 by way of the data path 34. Preferably, the advisors receive a request for the changed notification message from the host by way of the advisor backplane 50. In response, the advisors generate a signal representing a particular quality of the design, and pass this signal back to the advisor backplane.

Figure 2:
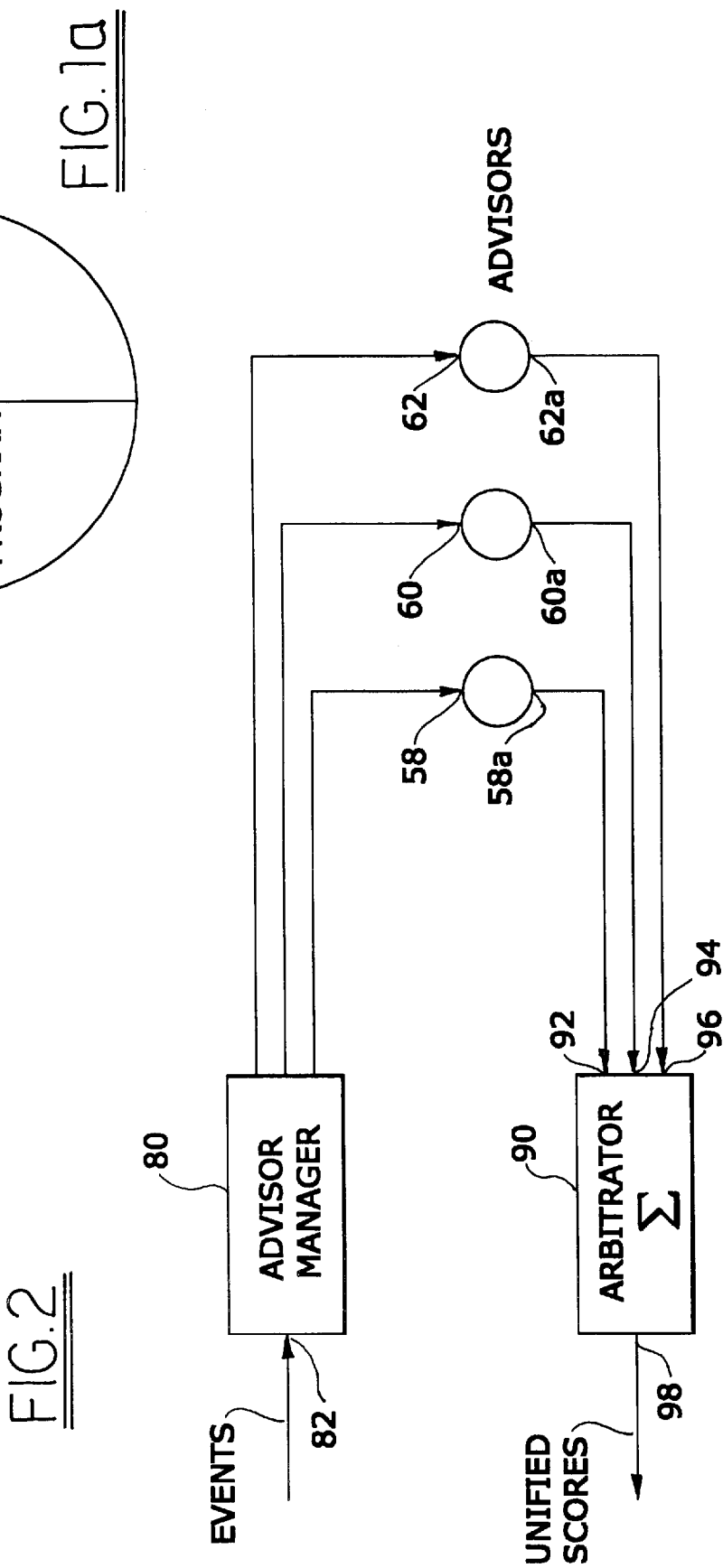
FIG. 2 is a detailed block diagram of an advisor backplane and a plurality of advisors in accordance with the invention.

The construction of advisor backplane 50 is shown in more detail in FIG. 2. The connections between the advisors and memory 30 are not shown in FIG. 2 for simplicity. The advisor backplane includes an advisor manager for receiving event signals from host 20 by way of an input 82. The advisor manager stores data identifying the advisors connected to the advisor backplane and passes event signals to appropriate advisors in response to an event signal appearing at input 82. For example, not all events would affect the particular quality of a design monitored by every advisor. By signaling only the advisors that need to recalculate the quality of the design in response to a particular event, the advisor manager conserves resources. Alternatively, all advisors can be signaled and any advisor that does not need to recalculate the quality of the design can respond by returning a stored value determined from a previous calculation.

The advisors present an output signal at outputs 58A, 60A and 62A respectively, which are connected to an arbitrator 90. The arbitrator 90 combines the signals received at inputs 92, 94 and 96 to produce a unified score at output 98, which is coupled to input 54 of host 20. Preferably, arbitrator 90 combines the outputs of the plurality of advisors as a nonlinear average of the advisor outputs. This permits the relative importance of the multiple advisors that may be affected by a change to be adjusted to optimize a particular characteristic of the design more quickly than if all the advisor outputs were weighted equally. In cases where an advisor determines that the proposed change produces a result that falls outside a predetermined range, the advisor can return a VETO indicating that the change is not acceptable.

The apparatus for evaluating designs shown in FIGS. 1 and 2 effectively isolates the advisors from the host and this has a number of advantages. The host need not consider what advisors are present when it implements requests for change. Likewise, the operation of each advisor is independent of the other advisors, and in fact each advisor preferably has no knowledge of the other advisors.

This arrangement permits advisors to be added or deleted more or less without regard to the presence of other advisors, or the operation of a host. To add an advisor, this invention uses an instantiation procedure shown in block diagram form in FIG. 3. As a first step, the user creates an advisor. Preferably, the advisor is a computer program with either its own dedicated processor or a shared processor running an advisor process that accepts inputs and calculates the quality signal.

After creating the advisor, the user sets advisor attributes and parameters for events in the advisor backplane to establish what events the advisor will receive to cause it to recalculate its quality signal. Specifically, the parameters include at least the identification of database items that must be monitored by the advisor and the type of events that require the particular advisor to recalculate the quality signal.

Finally, the user sets the relative importance weighting of the advisor in the backplane, so that the backplane can combine the output from the new advisor with the output of existing or other new advisors to generate the overall quality signal.

Figure 5:
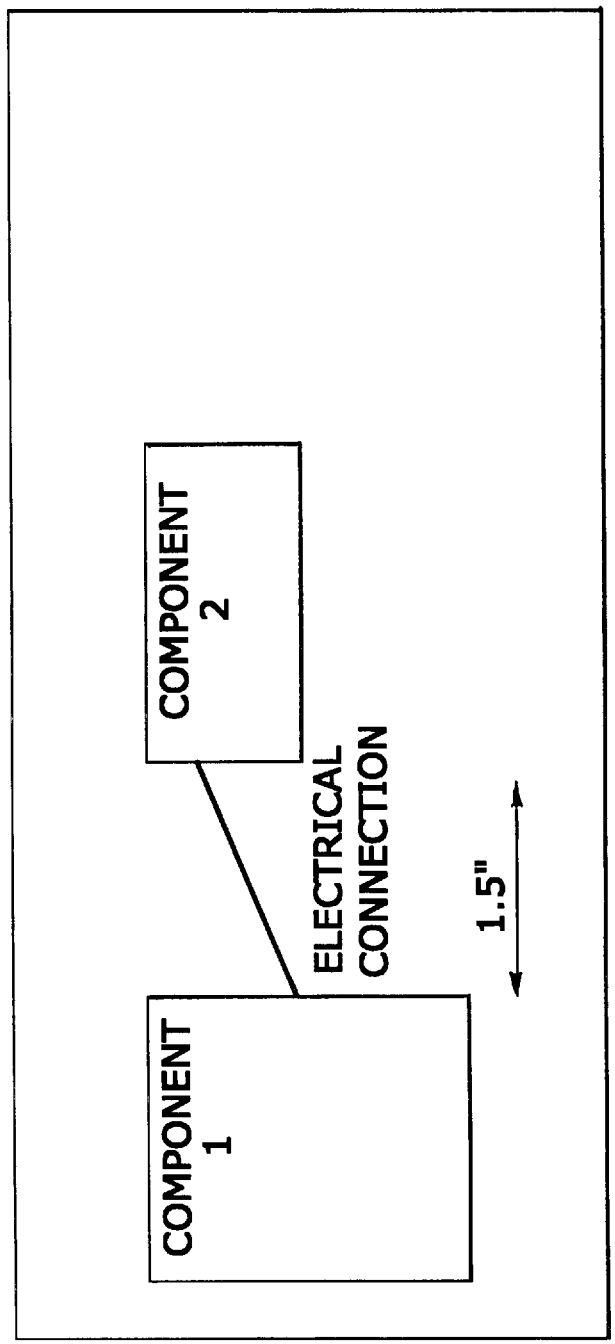
FIG. 5 is a schematic representation of a simplified design that can be optimized using the method and apparatus of this invention.
Figure 6:
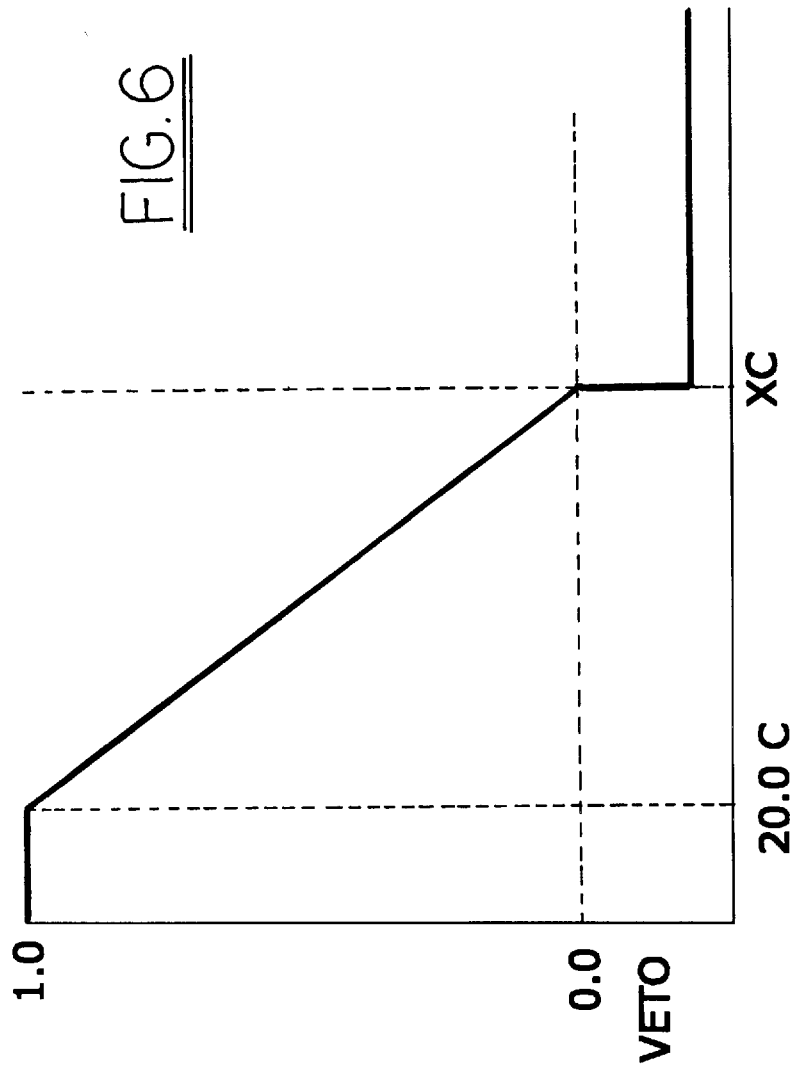
FIG. 6 is a graphical representation of the thermal advisor responsive curve for the design shown in FIG. 4.

FIGS. 5–7 show how a simple advisor functions. The following example describes how the backplane and the advisor interact to assist the user in optimizing the design.

First, the user instantiates an electrical advisor. The electrical advisor is constructed to monitor a rule, which we shall call Rule A. Rule A is defined to monitor the length of an electrical connection between two components, component 1 and component 2, as shown for example in FIG. 5. The connection can be no longer than two inches, no shorter than one inch, and preferably it is 1.5 inches.

Figure 3:
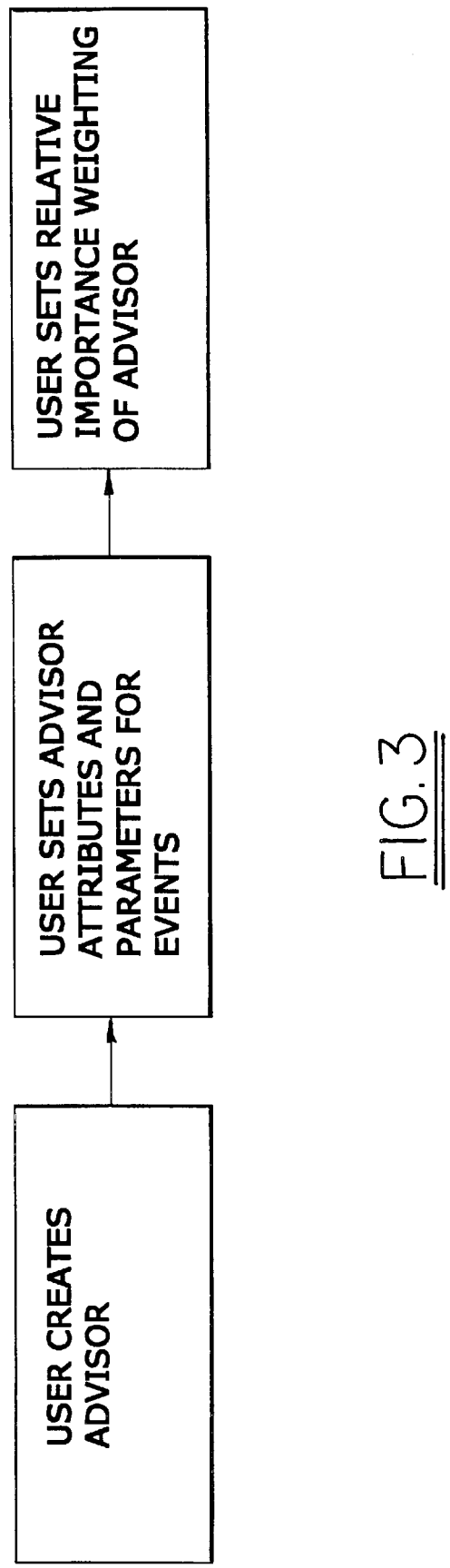
FIG. 3 is a flow chart showing the creation and instantiation of an advisor in accordance with the invention.
Figure 4:
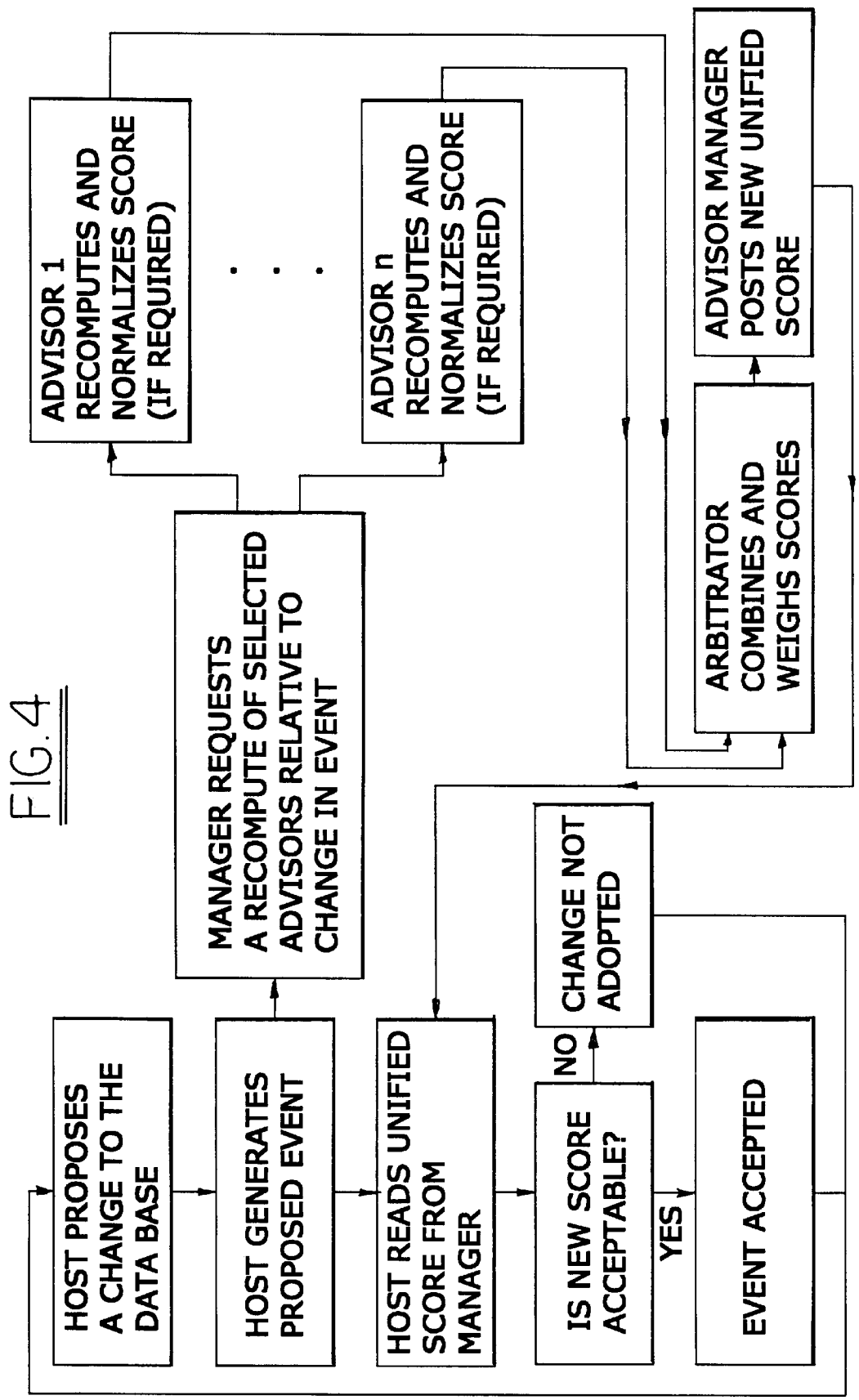
FIG. 4 is a flow chart showing the overall operation of a system for optimizing designs in accordance with the invention.

The user then instantiates a thermal advisor as shown in FIG. 3. A thermal advisor is configured to monitor component 1. Each component has been previously defined to have at least two thermal characteristics, the amount of heat the component generates, and the maximum temperature the component can withstand and operate correctly. In this example, component A generates a little heat itself, and has an upper bound of X degrees C. FIG. 4 shows the design in an initial state.

In this example, the user desires to move component 2. Preferably, components 1 and 2 are shown graphically on a display device, such as a CRT or LCD screen, and the user indicates the move by placing a cursor controlled by a pointing device on component 2, and moving it to a new location. The display tracks the move and shows the component 2 in its new location, for example, to the right of the location shown in FIG. 4. FIG. 6 shows an exemplary thermal advisor response curve. The output of the thermal advisor is shown on the vertical axis, and the temperature of the device is shown on the horizontal axis. When components 1 and 2 are moved further apart, each heats the other less and the temperature of component 2 is reduced. As the temperature is reduced, the output of the thermal advisor increases, preferably towards 1. It is preferable for all of the advisors to produce outputs in the same range, for example, between 0 and 1 units. The units themselves may be arbitrary and using a uniform system of units simplifies combining the outputs of the advisors.

As shown in FIG. 7, the electrical advisor output is 1, its maximum, when the distance between the components is 1.5 inches, the optimum distance according to the rule. As the distance between components deviates from 1.5 inches, either lower or higher, the output of the electrical advisor decreases from 1 towards 0.

In this example, the output of the thermal advisor increases as the temperature at the location to which component 1 is moved decreases. Concurrently, the electrical advisor output changes from 0 when the components are at their minimum spacing, and increases towards 1 as the spacing increases to 1.5 inches. In this example, at a particular distance, the output of the thermal advisor is 0.75 and the output of the electrical advisor is 0.25. Weighting both advisors equally, the average output from the advisor backplane will be 0.5. As the components are separated beyond the 1.5 inches optimum spacing to 1.8 inches, the output of the thermal advisor increases to 1.0, because the thermal effects of the components no longer influence each other. The electrical advisor output, however, decreases to 0.1 and the backplane arbitrator scores the design at 0.55. The backplane advisor provides a unified score to the host, which communicates to the user, so that the user can interactively move the components to maximize the quality of the design.

In accordance with a preferred aspect of the invention, the host program is arranged to use the quality information reported by the advisor backplane to automatically determine whether to accept the change or reject it. In accordance with this aspect of the invention, if the component is moved further to the right to 2.2 inches, the thermal advisor continues to report a 1.0 quality because the temperature does not influence component 2, but the 2 inch maximum distance between component 1 and component 2 is violated. When a limit is exceeded, the associated advisor preferably generates a VETO condition, such that no matter how high the average of the outputs of all the other advisors, the move (change) will not be accepted.

Here is a table showing the outputs of the thermal and electrical advisors and the advisor backplane for four distances between component 1 and component 2:

| Distance between components | Thermal output | Electrical output | Backplane output |
|---|---|---|---|
| 1.5 | 0.2 | 1.0 | 0.60 |
| 1.8 | 0.75 | 0.25 | 0.50 |
| 2.0 | 1.0 | 0.10 | 0.50 |
| 2.2 | 1.0 | VETO | VETO |

FIG. 4 shows an overall flow chart diagram of the operation of an apparatus for optimizing designs in accordance with this invention. The method involves a main loop and one sub-loop. In accordance with the invention in the main loop, the host proposes a change to the design in the nature of a change to the data base. The change may be generated either automatically or manually by a user. The host generates an event corresponding to the proposed change, and communicates the event to the advisor backplane. The host reads the new unified score from the advisor backplane and decides whether the score is acceptable, either because it is a better score than the previous score, or if not a better score, is at least not a VETO. If the answer is no, the change is not adopted. If the answer is yes, the event is accepted, and the change is adopted and the control returns to the top.

In the advisor loop, the advisor manager sends requests to the appropriate advisors to recompute the quality of the design relative to the change signaled by the event. The advisor backplane sends individual requests to the appropriate advisors 1-N. Each advisor recomputes and normalizes the quality score and sends the new score to the arbitrator. The arbitrator combines and preferably weights the scores and then posts a new unified score and sends it to the host.

The operation of the advisors and the approach to be taken in creating an advisor may be more readily appreciated by reference to the following simplified pseudo code for the host, for the backplane, and for an advisor.

```
// Host Pseudo Code
    ....
oldScore = NO_SCORE
// While there are more user events to process,
// fetch the next user event
WAITON (events, user)
{
  // Preform the user desired event
  PERFORM event.Action on event.Object
  // Post the event to the advisor backplane
  POST (event, backPlane)
  // Wait on the backplane to generate a new
  // score
  WAITON (newScore, backPlane)
  // If the newScore is not as good as the old score
  // then undo the last event putting the system back
  // in the previous state
  if (newScore < oldScore)
     undoLastEvent (event)
  else oldScore = newScore
}
// BackPlane PseudoCode
    ....
```

```
WAITON (event, hist)
{
  sum = 0
  for (i = 0; i < numAdvisors, i++)
  {
  advisor = advisorList [i];
  if (advisor.data == event.data &&
  advisor.action == event.action)
     {
     POST (event, advisor, recalc);
     WAITON (advisor, score_I);
     }
     else
     {
     POST (advisor, return);
     WAITON (advisor, score_I);
     }
  sum = sum + score_I
  }
  POST (host, sum / numAdvisors)
}
// Typical Advisor PseudoCode
WAITON (event, backplane)
{
  // There are two possible flavors of an event
  // coming to an advisor (recalc, and return)
  if (event.recalc)
  {
  // We have been asked to recalculate the
  // cost because some data has changed in
  // the host system. Use DataBaseInq Functions
  // to extract data from the host.
  sum Cost = 0
  numComponents = DataBaseInq (Host, NUM_COMPONENTS);
  for (i = 0; i < numComponents; i++)
     {
     component = DataBaseInq (Host, COMPONENT, I);
     cost = DataBaseInq (component, COST);
     sumCost = sumCost + cost;
     }
  // If the sum cost of all components is
  // greater than the constant MAX_COST
  // then VETO this change, otherwise develop a
  // score fromfrom 0 to 1, inversely
  // proportional to the sum cost of the
  // components
  if (sumCost > MAX_COST)
  POST (backPlane, VETO);
  else
     {
     lastScore = (MAX_COST − sumCost) / MAX_COST;
     POST (backPlane, lastScore);
     }
  }
  // If we have been requested to return the last
  // score, then do so now
  else if (event, newScore)
     POST (backPlane, lastScore);
}
```

With reference to the host pseudo code, initially there is no lastScore and NO_SCORE is preferably zero, or that special case of undefined data. The host processes events, preferably from an event queue by fetching events one at a time.

Preferably, a wait on loop fetches event messages from the queue one at a time until the queue is empty. The event message includes an identification of the object, event. Object and of the action to be performed on the event, event. Action. The state of the design prior to performing the event is stored, so that the event can be undone if necessary.

The host posts the event to the advisor backplane, so that the backplane can in turn post each event to the relevant advisors as we will describe shortly.

The host then waits for the backplane to return a new score based on the results of the event. The host compares the new score to the old score and if the new score does not represent an improvement, the host optionally undoes the last event, based on the stored state of the design, otherwise the new score replaces the previous old score and the wait loop continues.

Note that the host pseudo code is not dependent on the number or kind of advisors used to evaluate the design.

The backplane pseudo code is also a loop waiting for events to be posted from the host. When an event is posted, the backplane pseudo code loops through the number of advisors and for each advisor compares the event data and action types to the stored advisor data and action types to determine whether the advisor should be notified of the particular event. If yes, the backplane posts the event to the advisor with the message RECALC to ask the advisor to recalculate the score, and waits for a new score to be received from each advisor.

For the remaining advisors, the backplane simply sends a return message to each advisor and waits for the advisors' response.

The backplane sums all of the reported scores (score _I) and posts the average of the scores to the host. Note that the numerical average is used in this example, but a non-linear averaging may be preferable in some cases.

The function of the advisors themselves may be appreciated by reference to the exemplary advisors' pseudo code. The advisors wait in a loop for events to be posted from the backplane. The message from the backplane to the advisor can ask for a recalculation or for a return of the last score. If the backplane requests a recalculation, the advisor sends an inquiry to the database requesting the number of components present. The advisor then loops through the number of components and sends an inquiry to the database for information sufficient to allow the advisor to recalculate the cost based on the change (proposed change). Note that by "cost" we mean any characteristic of the design, not necessarily the monetary cost. For example, cost may include thermal cost or connector length cost, or the like. The advisor sums the cost for all components and compares the sum to a maximum cost to determine whether to post a VETO to the backplane. Otherwise, the advisor calculates a normalized cost between zero and one, and reports this cost to the backplane.

If the event requests a new score rather than a recalculation, the advisor returns the last score calculated.

The pseudo code just described permits the three routines to execute in parallel. Those skilled in the art will understand that while this is preferred, parallel operation is not required.

While the invention has been described in connection with a presently preferred embodiment thereof, those skilled in the art will recognize that certain modifications and changes may be made therein without departing from the true spirit and scope of the invention which is intended to be defined solely by the following claims.

What is claimed is:

1. Apparatus for evaluating designs for a device comprising:
   a memory for storing data representing a current design for the device;
   a host processor connected to the memory and having a change input for receiving an input signal representing a change in the design and an event output, for generating an event signal indicating at least that a change has occurred;
   a plurality of advisors, each advisor having an event input for receiving an event signal, a data input connected to the memory, and an advisor processor evaluating a design and for generating a scoring signal representing a selected quality of the design, and presenting the scoring signal to an advisor scoring output; and
   an advisor backplane connected between the host processor and the advisors, the advisor backplane having an advisors' event input coupled to the host processor event output for receiving the event signals, and a plurality of event outputs coupled to the advisors' event inputs, and a scoring input connected to the advisors' scoring outputs for receiving the scoring signals from the advisors and for combining the scores for generating a unified scoring signal representing the overall quality of the design, and a scoring output for transmitting the unified scoring signal to the host.

2. The apparatus of claim 1 in which the host processor has a data output connected to the memory for updating data stored in the memory in response to the input signal representing a change in the design; and
   the plurality of advisors is connected to the memory for retrieving data representing the change in the design, and utilizing the data to generate the scoring signal.

3. The apparatus of claim 2 in which the host processor passes information about the change to the advisors from which a new quality signal can be determined.

4. The apparatus of claim 3 in which the input signal representing a change comprises a description of the object that is to change, and a description of the action that is performed on the object to generate the change.

5. The apparatus of claim 2 in which the unified scoring signal comprises an non-linear average of the advisors' outputs.

6. The apparatus of claim 2 in which the advisors comprise a memory for storing a most recent scoring signal and in which the advisor processor provides the most recent scoring signal as a current score if a new current score cannot or has not been calculated.

7. The apparatus of claim 2 in which the scoring signal includes a VETO signal indicating that the change is outside predetermined limits.

8. The apparatus of claim 2 in which the scoring signal includes a NODATA signal indicating that no quality score can be generated.

9. The apparatus of claim 2 in which the scoring signals produced by the plurality of advisors have the same maximum and minimum values.

10. The apparatus of claim 2 in which the advisor backplane determines from the event signal which one of the plurality of advisors should recalculate the scoring signal and transmits a request to each such advisor to recalculate.

11. The apparatus of claim 10 in which the unified scoring signal comprises an non-linear average of the advisors' outputs.

12. The apparatus of claim 10 in which the advisors comprise a memory for storing a most recent scoring signal and in which the advisor processor provides the most recent scoring signal as a current score if a new current score cannot or has not been calculated.

13. The apparatus of claim 10 in which the scoring signal includes a VETO signal indicating that the change is outside predetermined limits.

14. The apparatus of claim 10 in which the scoring signal includes a NODATA signal indicating that no quality score can be generated.

15. The apparatus of claim 10 in which the scoring signals produced by the plurality of advisors have the same maximum and minimum values.

16. The apparatus of claim 10 in which the host processor passes information about the change to the advisors from which a new quality signal can be determined.

17. The apparatus of claim 16 in which the input signal representing a change comprises a description of the object that is to change, and a description of the action that is performed on the object to generate the change.

18. The apparatus of claim 17 in which the scoring signals produced by the plurality of advisors have the same maximum and minimum values.

19. The apparatus of claim 18 in which the scoring signal includes a VETO signal indicating that the change is outside predetermined limits.

20. The apparatus of claim 19 in which the scoring signal includes a NODATA signal indicating that no quality score can be generated.

21. The apparatus of claim 20 in which the advisor backplane after transmitting a request to selected advisors to recalculate, transmits a request to all advisors to send a current scoring signal.

22. The apparatus of claim 21 in which the advisors comprise a memory for storing a most recent scoring signal and in which the advisor processor provides the most recent scoring signal as a current score if a new current score cannot or has not been calculated.

23. A design evaluating unit comprising:
a memory for storing data representing a design for a device, an advisor manager having an input for receiving an input signal representing a change in the design and a processor connected to the memory and the input for generating a plurality of event signals at a processor output, each event signal indicating a characteristic of the design change;
a plurality of advisors, each advisor having an advisor input for receiving an event signal, an advisor processor for evaluating a design and generating a scoring signal representing a selected quality of the design, and presenting the scoring signal to an advisor output; and
an advisor arbitrator connected to the advisors' outputs for receiving the scoring signals from the advisors and generating a unified scoring signal representing the overall quality of the design.

24. The apparatus of claim 23 in which the host processor has a data output connected to the memory for updating data stored in the memory in response to the input signal representing a change in the design; and
the plurality of advisors is connected to the memory for retrieving data representing the change in the design, and utilizing the data to generate the scoring signal.

25. The apparatus of claim 23 in which the host processor passes information about the change to the advisors from which a new signal representing a selected quality can be determined.

26. The apparatus of claim 25 in which the input signal representing a change comprises a description of an element of the design that is to change, and a description of the action that is performed on the element of the design to generate the change.

27. The apparatus of claim 24 in which the unified scoring signal comprises a non-linear average of the advisors' outputs.

28. The apparatus of claim 24 in which the advisors comprise a memory for storing a most recent scoring signal and in which the advisor processor provides the most recent scoring signal as a current score if a new current score cannot or has not been calculated.

29. The apparatus of claim 24 in which the scoring signal includes a VETO signal indicating that the change is outside predetermined limits.

30. The apparatus of claim 24 in which the scoring signal includes a NODATA signal indicating that no quality score can be generated.

31. The apparatus of claim 24 in which the scoring signals produced by the plurality of advisors have the same maximum and minimum values.

32. The apparatus of claim 24 in which the advisor manager determines from the event signal which one of the plurality of advisors should recalculate the scoring signal and transmits a request to each such advisor to recalculate.

33. The apparatus of claim 32 in which the unified scoring signal comprises a non-linear average of the advisors outputs.

34. The apparatus of claim 32 in which the advisors comprise a memory for storing a most recent scoring signal and in which the advisor processor provides the most recent scoring signal as a current score if a new current score cannot or has not been calculated.

35. The apparatus of claim 32 in which the scoring signal includes a VETO signal indicating that the change is outside predetermined limits.

36. The apparatus of claim 32 in which the scoring signal includes a NODATA signal indicating that no quality score can be generated.

37. The apparatus of claim 32 in which the scoring signals produced by the plurality of advisors have the same maximum and minimum values.

38. The apparatus of claim 32 in which the host processor passes information about the change to the advisors from which a new quality signal can be determined.

39. The apparatus of claim 38 in which the input signal representing a change comprises a description of the object that is to change, and a description of the action that is performed on the object to generate the change.

40. The apparatus of claim 39 in which the scoring signals produced by the plurality of advisors have the same maximum and minimum values.

41. The apparatus of claim 40 in which the scoring signal includes a VETO signal indicating that the change is outside predetermined limits.

42. The apparatus of claim 41 in which the scoring signal includes a NODATA signal indicating that no quality score can be generated.

43. The apparatus of claim 42 in which the advisor manager after transmitting a request to selected advisors to recalculate, transmits a request to all advisors to send a current scoring signal.

44. The apparatus of claim 43 in which the advisors comprise a memory for storing a most recent scoring signal and in which the advisor processor provides the most recent scoring signal as a current score if a new current score cannot or has not been calculated.

* * * * *